(12) United States Patent
Dworakowski

(10) Patent No.: US 12,094,176 B2
(45) Date of Patent: *Sep. 17, 2024

(54) METHODS AND SYSTEMS FOR CALIBRATING A CAMERA

(71) Applicant: Aptiv Technologies AG, Schaffhausen (CH)

(72) Inventor: Waldemar Dworakowski, Cracow (PL)

(73) Assignee: Aptiv Technologies AG, Schaffhausen (CH)

( * ) Notice: Subject to any disclaimer, the term of this patent is extended or adjusted under 35 U.S.C. 154(b) by 57 days.

This patent is subject to a terminal disclaimer.

(21) Appl. No.: 18/059,085

(22) Filed: Nov. 28, 2022

(65) Prior Publication Data

US 2023/0091606 A1    Mar. 23, 2023

Related U.S. Application Data

(63) Continuation of application No. 17/145,098, filed on Jan. 8, 2021, now Pat. No. 11,538,193.

(30) Foreign Application Priority Data

Jan. 10, 2020  (EP) .................................... 20151132

(51) Int. Cl.
  *G06T 7/80*  (2017.01)
(52) U.S. Cl.
  CPC ...... *G06T 7/85* (2017.01); *G06T 2207/10012* (2013.01); *G06T 2207/10028* (2013.01); *G06T 2207/30208* (2013.01); *G06T 2207/30244* (2013.01)

(58) Field of Classification Search
  None
  See application file for complete search history.

(56) References Cited

U.S. PATENT DOCUMENTS

| 6,697,761 | B2 | 2/2004 | Akatsuka et al. |
| 8,326,084 | B1 | 12/2012 | Marrion, Jr. et al. |
| 10,210,615 | B2 | 2/2019 | Liu et al. |
| 10,703,508 | B1 * | 7/2020 | Mehnert ................. G06F 30/20 |

(Continued)

FOREIGN PATENT DOCUMENTS

| EP | 1923756 B1 | 4/2009 |
| EP | 3435282 A2 | 1/2019 |

(Continued)

OTHER PUBLICATIONS

"Foreign Office Action", EP Application No. 20151132.6, Mar. 6, 2023, 5 pages.

(Continued)

*Primary Examiner* — Soo Shin
(74) *Attorney, Agent, or Firm* — Harness, Dickey & Pierce, P.L.C.

(57) ABSTRACT

A computer implemented method for calibrating a camera comprises the following steps carried out by computer hardware components: activating a subset of a plurality of light sources according to a plurality of activation schemes, wherein each activation scheme indicates which of the plurality of light sources to activate; capturing an image for each activation scheme using the camera; and calibrating the camera based on the captured images.

20 Claims, 3 Drawing Sheets

(56) References Cited

U.S. PATENT DOCUMENTS

| | | | |
|---|---|---|---|
| 10,742,969 B1* | 8/2020 | Rohatgi | H04N 17/002 |
| 11,538,193 B2* | 12/2022 | Dworakowski | G06T 7/80 |
| 2007/0291047 A1* | 12/2007 | Harville | G06T 5/80 |
| | | | 345/589 |
| 2007/0291189 A1* | 12/2007 | Harville | G06F 3/1423 |
| | | | 349/7 |
| 2008/0170228 A1* | 7/2008 | Jiang | H04N 17/002 |
| | | | 356/416 |
| 2010/0165116 A1* | 7/2010 | Hsieh | H04N 5/2224 |
| | | | 348/187 |
| 2010/0177195 A1* | 7/2010 | Colentier | G02B 27/0037 |
| | | | 348/E5.09 |
| 2014/0173335 A1* | 6/2014 | Dworakowski | G06F 11/2007 |
| | | | 714/4.11 |
| 2015/0117756 A1* | 4/2015 | Tosic | G06F 17/14 |
| | | | 382/154 |
| 2016/0173849 A1* | 6/2016 | Tosic | H04N 13/161 |
| | | | 382/154 |
| 2016/0182903 A1* | 6/2016 | Grundhöfer | H04N 17/002 |
| | | | 348/187 |
| 2016/0309140 A1* | 10/2016 | Wang | H04N 17/002 |
| 2017/0256059 A1* | 9/2017 | Tosic | G06T 7/11 |
| 2018/0367681 A1 | 12/2018 | Xu et al. | |
| 2019/0164308 A1 | 5/2019 | Li et al. | |
| 2020/0184684 A1* | 6/2020 | Ma | G06T 7/174 |
| 2020/0406904 A1* | 12/2020 | Yan | G07C 5/0841 |
| 2020/0410715 A1* | 12/2020 | Cadien | G01S 13/867 |
| 2021/0295560 A1* | 9/2021 | Dworakowski | H04N 17/002 |
| 2021/0316669 A1* | 10/2021 | Wang | G01S 17/86 |
| 2022/0048517 A1* | 2/2022 | Khayyer | B60W 50/04 |

FOREIGN PATENT DOCUMENTS

| | | |
|---|---|---|
| WO | 2006004192 A1 | 1/2006 |
| WO | 2008143614 A1 | 11/2008 |
| WO | 2009061519 A1 | 5/2009 |
| WO | 2011012142 A1 | 2/2011 |
| WO | 2014186970 A1 | 11/2014 |
| WO | 2017093037 A1 | 6/2017 |
| WO | 2019050417 A1 | 3/2019 |

OTHER PUBLICATIONS

"Extended European Search Report", EP Application No. 20151132.6, May 12, 2020, 7 pages.

* cited by examiner

METHODS AND SYSTEMS FOR CALIBRATING A CAMERA

CROSS-REFERENCE TO RELATED APPLICATIONS

This application is a continuation of U.S. patent application Ser. No. 17/145,098, filed Jan. 8, 2021, which claims priority to European Patent Application Number 20151132.6, filed Jan. 10, 2020, the disclosures of which are hereby incorporated by reference in their entireties herein.

TECHNICAL FIELD

The present disclosure relates to methods and systems for calibrating a camera, and in particular to methods and systems for calibrating a camera provided in a vehicle.

BACKGROUND

Digital imaging devices, such as digital cameras, are used in various automotive applications. Calibration of the digital cameras may be cumbersome.

For example, in current approaches, either multiple settings of the camera versus a target or one image from a single setting of camera may be used. In either of two methods, a high number of characteristic 'points' may be required, for example in the form of circles or squares in precisely known locations to compute a space relation of those objects to the camera. This may put high requirements on the image quality and on the precision of the setup. Current automotive cameras, may use imagers (for example cameras or image sensors) with 4k or better resolution, a lens field-of-view may be from a few degrees to more than 150 degrees with diaphragm aperture below f/2, and a hyperfocal distance may be in the range from 10 m to hundreds of meters. This may put high and practically unacceptable requirements on the calibration equipment, both regarding to the required precision and space and to the calibration time. Solutions including special immediate optics or collimators increase price of the calibration setup and at the same time reduce achievable precision.

Accordingly, there is a need to provide efficient methods and systems for calibrating a camera.

SUMMARY

The present disclosure provides a computer implemented method, a computer system and a non-transitory computer readable medium according to the independent claims. Embodiments are given in the subclaims, the description and the drawings.

In one aspect, the present disclosure is directed at a computer implemented method for calibrating a camera, the method comprising the following steps performed (in other words: carried out) by computer hardware components: activating a subset of a plurality of light sources according to a plurality of activation schemes, wherein each activation scheme indicates which of the plurality of light sources to activate; capturing an image for each activation scheme using the camera; and calibrating the camera based on the captured images.

In other words, a plurality of light sources is provided, and several images may be captured by the camera, wherein in each image one or more of the light sources is activated and the other light sources are not activated. In each image, the subset of light sources which is activated may be different. These images may then be used for calibration of the camera.

For example, the method may be a method for calibration of a vehicle sensing camera.

The light sources may include lights, which may be lights of a pre-determined wavelength range, or which may be light emitting diodes of a pre-determined wave length. All light sources may emit light of the same wavelength or wavelength range, or the light sources may have different wavelength ranges or wavelengths, so that the different light sources may be distinguished by their color.

Various methods for calibrating may be used. Conventional methods which usually are based on various images with different content may be applied to the plurality of captured images showing different light sources activated in each image. These images may be captured in an automated manner by synchronizing the steps of activating the light sources and capturing the image. Methods that could be used for the calibration are for an example Zhan method or Tsai method or other using multiple points on the single image.

According to another aspect, at least one activation scheme comprises an indication of one light source of the plurality of light sources at a time. By activating only one light source at a time, there may be no interference between the light sources, i.e. the light captured by the camera may unambiguously be assigned to the light source.

According to another aspect, at least one activation scheme comprises an indication of a plurality of light source at a time. By activating more than one light source at a time, more information may be acquired by each captured image, which may reduce the overall calibration time.

According to another aspect, the plurality of light sources at a time are at least a pre-determined distance apart when seen from the angle of the camera. This may avoid interference of the light sources, so that the light captured by the camera may unambiguously be assigned to the respective light source, even when more than one light source is activated at a time.

According to another aspect, capturing the image for each activation scheme comprises capturing an image of the plurality of light sources.

According to another aspect, the plurality of light sources are provided in a three-dimensional space according to a pre-determined (i.e. known) spatial relationship amongst each other, and in a pre-determined (i.e. known) spatial relationship to the camera. The light sources may be provided in locations which are not on a single line or not on a single two-dimensional plane, so that the full variety of the three-dimensional space may be used.

According to another aspect, the computer implemented method further comprises the following steps carried out by the computer hardware components: determining positions of the activated light sources in the captured images. For example, the images may be captured with the light sources out of focus, which may reduce the required distance between the camera and the light sources, and the respective positions may then be determined based on a center of the blurry (due to defocused capturing) light spots in the captured images.

According to another aspect, the positions in the captured images are determined based on a method for identification of candidate points as possible characteristic points of a calibration pattern within an image of the calibration pattern, the method for identification of candidate points comprising the steps of: determining spots within a filtered image derived from the image of the calibration pattern, with a spot being defined as a coherent set of pixels of the filtered image having pixel values exceeding a threshold, for each determined spot calculating a central point of the determined spot, and identifying as candidate points all calculated central points, wherein the step of determining the spots comprises scanning the filtered image one pixel of the filtered image after another. According to a further aspect, if a scanned pixel has a pixel value exceeding the threshold, the scanning is paused and a spot contour tracing is executed starting with the last scanned pixel as current pixel and the second last pixel as previous pixel, the spot contour tracing comprising as a tracing step the steps of logging the current pixel as a contour pixel, and the method for identification of candidate points further comprises the steps of: for neighboring pixels adjacent to the current pixel, evaluating the condition, whether both the neighboring pixel has a pixel value exceeding the threshold and another neighboring pixel, which immediately precedes this neighboring pixel with respect to a sense of rotation around the current pixel, has a pixel value not exceeding the threshold, selecting from all neighboring pixels, for which the condition is fulfilled, the neighboring pixel farthest from the previous pixel with respect to said sense of rotation, and defining the current pixel as previous pixel and defining the selected neighboring pixel as current pixel; the spot contour tracing further comprising the steps of repeating the tracing step until the current pixel is again equal to the last scanned pixel, determining the spot as the set of pixels comprising the logged contour pixels and the pixels surrounded by the logged contour pixels.

A gravity point of the blurred light point may then be determined as the center of gravity of the pixels surrounded by the contour pixels.

According to another aspect, calibrating the camera comprises determining at least one intrinsic camera parameter or at least one extrinsic camera parameter or at least one distortion parameter.

For example, the at least one intrinsic parameter comprises at least one of a focal length of the camera, a sensitivity of the camera, or an aperture of the camera. For example, the at least one extrinsic parameter comprises at least one of a position of the camera in space or an orientation of the camera in space. For example, the at least one distortion parameter comprises at least one of a defocus parameter of the camera, a spherical aberration parameter of the camera, a coma parameter of the camera, an astigmatism parameter of the camera, a field curvature parameter of the camera, or an image distortion parameter of the camera.

In another aspect, the present disclosure is directed at a computer system, said computer system comprising a plurality of computer hardware components configured to carry out several or all steps of the computer implemented method described herein.

The computer system may comprise a plurality of computer hardware components (for example a processing unit, at least one memory unit and at least one non-transitory data storage). It will be understood that further computer hardware components may be provided and used for carrying out steps of the computer implemented method in the computer system. The non-transitory data storage and/or the memory unit may comprise a computer program for instructing the computer to perform several or all steps or aspects of the computer implemented method described herein, for example using the processing unit and the at least one memory unit.

According to another aspect, the computer system further comprises the plurality of light sources. For example, the plurality of light sources are provided in a three-dimensional space according to a pre-determined spatial relationship amongst each other, and in a pre-determined spatial relationship to the camera.

According to another aspect, the computer system further comprises a storage medium configured to store the captured images.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

Figure 1:
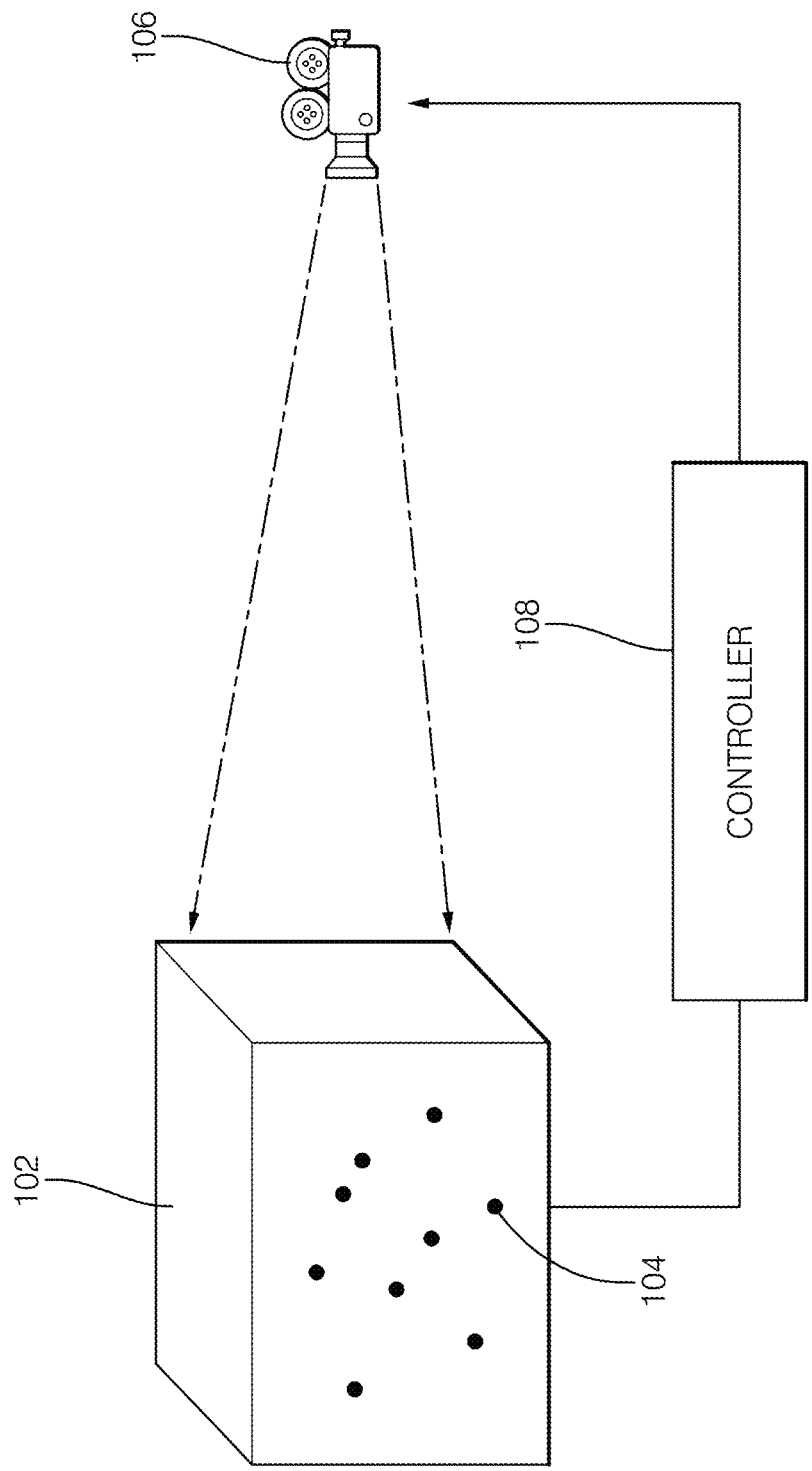
FIG. 1 a calibration system according to various embodiments.

FIG. 1 shows a calibration system 100 according to various embodiments. A plurality of light points 104 may be provided in a 3D space 102. For example, the light points 104 may be small circular light points 104, and there may be provided between ten and several thousand light points 104. Each of the light points 104 may be individually controlled by a controller 108 (for example a computer). The location of the points 104 may be known relative to each other and relative to the estimated position of a camera 106. The camera 106 may be looking at the 3D space 102 the light points 104, and may be capturing a series of images (for example a movie) while the controller 108 switches on and off one or more of the light points 104 at the same time. The images captured by the camera 106 may be analyzed to produce intrinsic or extrinsic calibration data. The images captured by the camera 106 may be analyzed online (i.e. during the operation of the lights) or may be recorded (for example in a storage provided in the controller 108 or attached to the controller 108, or an external media) for analysis on the same or different equipment (i.e. for later analysis using the controller 108, or for analysis using a device different from the controller 108).

With the system as illustrated in FIG. 1, a single pose multi image calibration may be provided. For example, the calibrated camera may be a safety and road assistance camera.

According to various embodiments, the plurality of light sources may be provided in a fixed arrangement, so that the respective relative positions of the plurality of light sources may be fixed and known. The arrangement may then be provided at a single position (with a relative position in 2D or 3D) relative to the camera, so that the plurality of images may be captured without moving the arrangement. The distance from the camera to the arrangement (which may also be referred to as a calibration field) may be well below the hyperfocal distance of the camera.

The captured images may be provided as a sequence of 2D or 3D images (showing (blurred) light points of the light sources) presented to the camera with light points using wide spectra ('white'), single color or multi color points.

According to various embodiments, the calibration system and calibration method may allow calibration of very wide (for example 100 degree or wider) automotive cameras or very narrow (for example 30 degree or narrower) cameras in the limited space on the production line, where it may be easier to get a space below 1.8 m/1.8 m/3 m than getting 10 m/10 m/10 m or more. For narrow cameras (like for 28 degree where hyperfocal distance is >50 m) this may be a matter of making precision calibration practically 'doable' or 'impractical'.

According to various embodiments, the calibration system and method may be applied at limited spaces, even for large image field where usually large distances from the camera are required. According to various embodiments, not sharp images may be used with the assumption that circular light points are seen by the camera in this case as distorted circles. Since not all the points are activated (in other words: switched on) at the same time, distribution of the light from a single point to the pixels on the captured image may be measured and it may be computed where the light was originally located in the projection (and hence in the 3D space relative to the camera). This may be done for each and every light point separately or in groups of light points if those do not interfere with each other (for example, if these light points are sufficiently spaced apart, as illustrated in FIG. 2A below, or if these light points have different colors, i.e. when the respective light sources emit light of different wavelengths or different wavelength ranges).

Figure 2A:
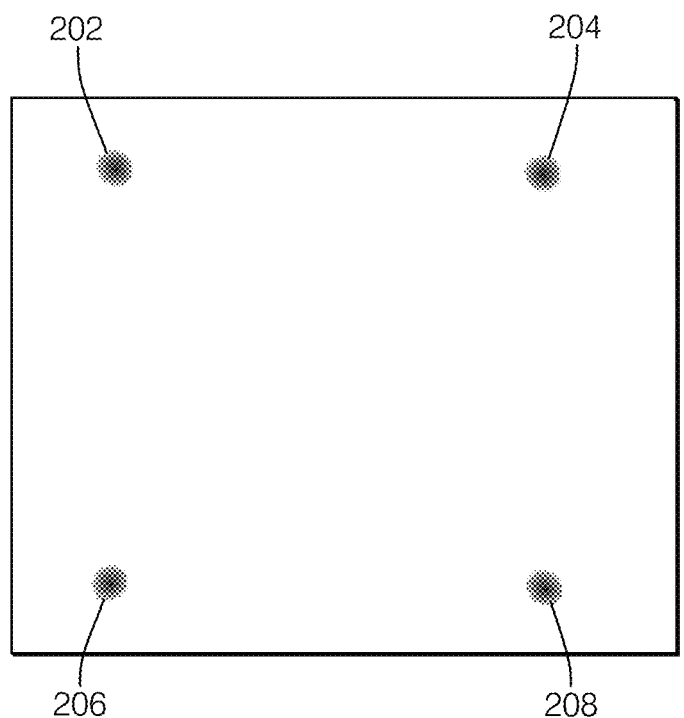
FIG. 2A an illustration of a captured image showing multiple non-interfering blurred light points.

FIG. 2A shows an illustration 200 of a captured image showing multiple non-interfering blurred light points 202, 204, 206, 208 according to various embodiments.

Figure 2B:
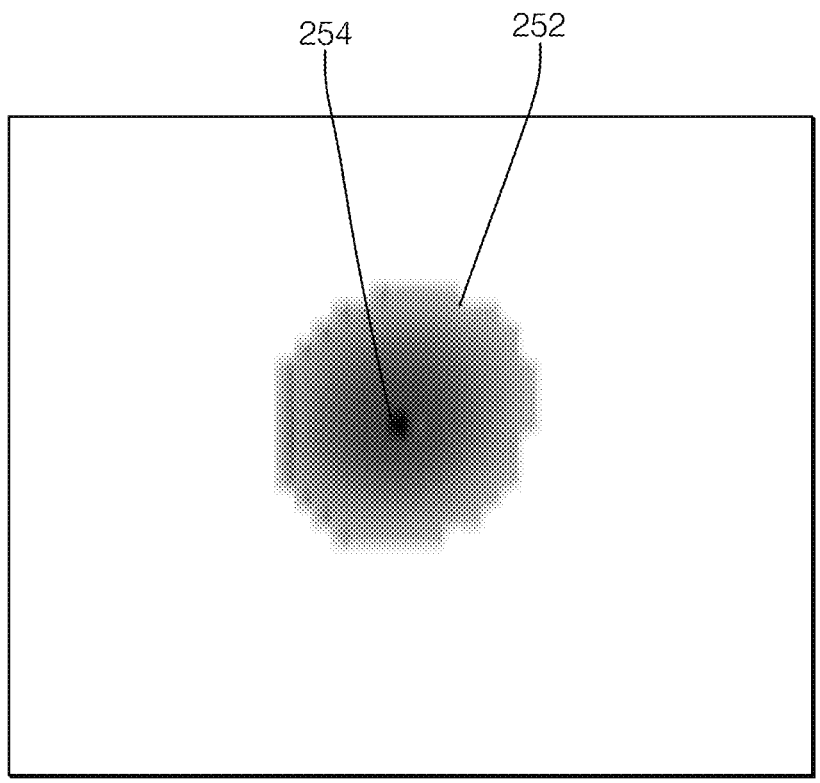
FIG. 2B an illustration of an enlarged portion of a captured image with a single blurred light point with a computed gravity point according to various embodiments.

FIG. 2B shows an illustration 250 of an enlarged portion of a captured image with a single blurred light point 252 with a computed gravity point 254 according to various embodiments.

Each of light points in a captured image (for example in an imager of the camera) may allow computing the central point (in other words: the center of gravity) of the light point so that the same type of the information may be obtained as if a sharp image (i.e. an image in focus) would be captured, even if the light sources are out of focus. The method to find those points may be identical or similar to the method provided in WO/2017/093037, for example with the change for the correlation image to a circle or as a 'gravity point' approach surrounded by the 'equipotential plate'. As the result of this process, the location of the complete set of points may be obtained from multiple exposures but at one position. Those locations may be then used in the usual way in the calibration. As the end result, calibration values (for example both intrinsic and extrinsic) may be obtained after analysis of the series of the imaged (or pictures) taken (or acquired) from one single location of the camera while the size of the field (i.e. the 3D space where the light sources are required) may be small, for example around 1.5 m/1.5 m/1.5 m and the distance to the camera may be dependent on the focal length but well below required in currently existing calibration methods.

According to various embodiments, light switching (i.e. selective activation of one or more light sources) may be synchronized with the camera operation, for example by close loop operation (where light sources are activated and then the image is captured, and then it may be proceeded to the next combination (or activation scheme) of active light sources) or by an open loop method (where only the approximate frame frequency may need to be known to synchronize the activation of the light sources and the capturing of the images, and where it may be started with the light sources switched off, and then for each step, the combination of light sources may be set, then it may be waited for a predetermined frame period (for example for 3 frame periods), and it may then be proceeded to the next step (with the next activation scheme), wherein the last step may be to switch off all the light sources).

The sequence of activation of the light sources (in other words: the activation schemes) may be changed, but may be longer when there are single wavelength light sources only. In the analysis of captured images (which may be in the data format of video frames), it may be looked for the central frame between the change of the visible combination of light sources. In an example with 30 frames per second and 5 light sources being visible at the same time, and the field having 500 points (in other words: 500 light sources), the measurements (in other words: the capturing of the images) may be done in 10 seconds. This may be speeded up using multiple colors of the light sources for a color camera, so that even partially interfering points may be discriminable by their colors. With the previous conditions and three basic colors in the imager matrix (of the camera), the measurement may for example be done with in about 3.3 seconds for a simple scheme, and with a more complex scheme (three colors in shifted phases) the time may go down to about 3 seconds or lower. The difference between the simpler scheme (in other words: the 'longer' or slower method) and the more complex scheme (in other words: the 'shorter' or faster method) depends on the camera being capable to distinguish colors. In such case there may be two partially overlapping points with distinct primary colors which may be properly detectable, and the impact from each color may be properly deducted.

At the same time, issues with elimination of the color mosaic from the pictures may be reduced or avoided. The color mosaic in the imager is usually eliminated in the process of the point detection process. When multiple colors in the light sources are used, elimination of the mosaic may be easier, since light source correlate with colors on the imager color mask, even if different sets of colors are used.

Figure 3:
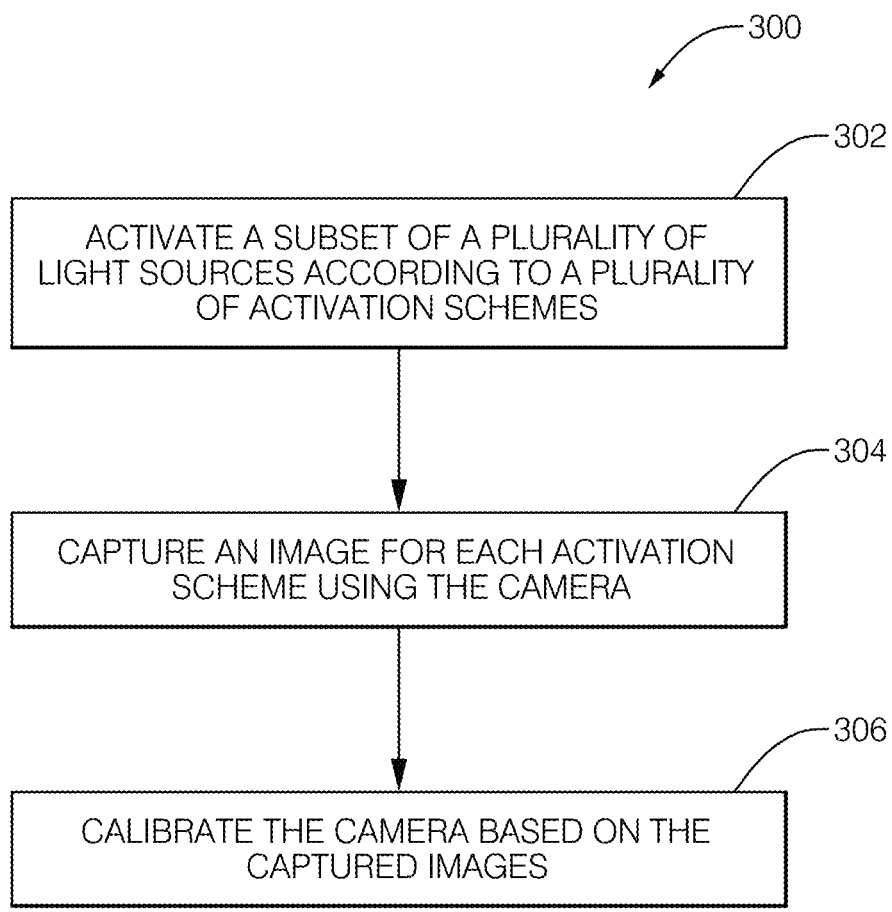
FIG. 3 a flow diagram illustrating a method for calibrating a camera according to various embodiments.

FIG. 3 shows a flow diagram 300 illustrating a method for calibrating a camera according to various embodiments. At 302, a subset of a plurality of light sources may be activated according to a plurality of activation schemes, wherein each activation scheme indicates which of the plurality of light sources to activate. At 304, an image may be captured for each activation scheme using the camera. At 306, the camera may be calibrated based on the captured images.

According to various embodiments, at least one activation scheme comprises an indication of one light source of the plurality of light sources at a time. According to various embodiments, at least one activation scheme comprises an indication of a plurality of light source at a time.

According to various embodiments, the plurality of light sources at a time are at least a pre-determined distance apart when seen from the angle of the camera.

According to various embodiments, capturing the image for each activation scheme comprises capturing an image of the plurality of light sources.

According to various embodiments, the plurality of light sources are provided in a three-dimensional space according to a pre-determined spatial relationship amongst each other, and in a pre-determined spatial relationship to the camera.

According to various embodiments, the method may further comprise determining positions of the activated light sources in the captured images.

According to various embodiments, the positions in the captured images are determined based on a method for identification of candidate points as possible characteristic points of a calibration pattern within an image of the calibration pattern, the method for identification of candidate points comprising the steps of: determining spots within a filtered image derived from the image of the calibration pattern, with a spot being defined as a coherent set of pixels of the filtered image having pixel values exceeding a threshold, for each determined spot calculating a central point of the determined spot, and identifying as candidate points all calculated central points, wherein the step of determining the spots comprises scanning the filtered image one pixel of the filtered image after another, wherein, if a scanned pixel has a pixel value exceeding the threshold, the scanning is paused and a spot contour tracing is executed starting with the last scanned pixel as current pixel and the second last pixel as previous pixel, the spot contour tracing comprising as a tracing step the steps of logging the current pixel as a contour pixel, for neighboring pixels adjacent to the current pixel, evaluating the condition, whether both the neighboring pixel has a pixel value exceeding the threshold and another neighboring pixel, which immediately precedes this neighboring pixel with respect to a sense of rotation around the current pixel, has a pixel value not exceeding the threshold, selecting from all neighboring pixels, for which the condition is fulfilled, the neighboring pixel farthest from the previous pixel with respect to said sense of rotation, and defining the current pixel as previous pixel and defining the selected neighboring pixel as current pixel; the spot contour tracing further comprising the steps of repeating the tracing step until the current pixel is again equal to the last scanned pixel, determining the spot as the set of pixels comprising the logged contour pixels and the pixels surrounded by the logged contour pixels.

According to various embodiments, calibrating the camera comprises determining at least one intrinsic camera parameter or at least one extrinsic camera parameter or at least one distortion parameter.

According to various embodiments, the at least one intrinsic parameter comprises at least one of a focal length of the camera, a sensitivity of the camera, or an aperture of the camera; wherein the at least one extrinsic parameter comprises at least one of a position of the camera in space or an orientation of the camera in space; and wherein the at least one distortion parameter comprises at least one of a defocus parameter of the camera, a spherical aberration parameter of the camera, a coma parameter of the camera, an astigmatism parameter of the camera, a field curvature parameter of the camera, or an image distortion parameter of the camera.

Each of the steps 302, 304, 306 and the further steps described above may be performed by computer hardware components.

What is claimed is:

1. A system comprising:
a camera disposed at a distance from a calibration field that is less than a hyperfocal distance of the camera; and
at least one processor configured to:
receive, from the camera, one or more captured images of the calibration field, the one or more captured images including multiple characteristic points within the calibration field;
determine respective centers of the characteristic points in each captured image;
determine, based on the respective centers of the characteristic points in each captured image, respective positions of the characteristic points relative to the camera in each captured image; and
calibrate the camera based on the positions of the characteristic points in each captured image.

2. The system of claim 1, further comprising the calibration field.

3. The system of claim 1, wherein:
the calibration field comprises multiple light sources; and
the characteristic points in each captured image are light points originating from one or more activated light sources of the multiple light sources.

4. The system of claim 3, wherein the at least one processor is further configured to activate a set of the multiple light sources according to a different activation scheme of a plurality of activation schemes for each captured image.

5. The system of claim 4, wherein at least two of the light sources of the set of the multiple light sources emit light having different wavelengths.

6. The system of claim 1, wherein the at least one processor is further configured to determine the respective positions of the characteristic points in the captured images based on identification of candidate points as possible characteristic points of a calibration pattern within each captured image by at least:
deriving a filtered image from the captured image including the calibration pattern;
determining spots within the filtered image, the spots being coherent sets of pixels of the filtered image having pixel values exceeding a threshold;
calculating central points of the spots; and
identifying the calculated central points as the candidate points.

7. The system of claim 6, wherein the at least one processor is configured to determine the spots within the filtered image by at least tracing a contour based on transitions between pixels with pixel values exceeding the threshold and neighboring pixels with pixel values below the threshold.

8. A non-transitory computer readable medium comprising instructions that, when executed, configure a processor to:
receive, from a camera disposed at a distance from a calibration field that is less than a hyperfocal distance of the camera, one or more captured images of the calibration field, the one or more captured images including multiple characteristic points within the calibration field;
determine respective centers of the characteristic points in each captured image;

determine, based on the respective centers of the characteristic points in each captured image, respective positions of the characteristic points relative to the camera in each captured image; and calibrate the camera based on the positions of the characteristic points in each captured image.

9. The non-transitory computer readable medium of claim 8, wherein:

the calibration field comprises multiple light sources; and the characteristic points in each captured image are light points originating from one or more activated light sources of the multiple light sources.

10. The non-transitory computer readable medium of claim 9, wherein the instructions, when executed, configure the processor to activate a set of the multiple light sources according to a different activation scheme of a plurality of activation schemes for each captured image.

11. The non-transitory computer readable medium of claim 10, wherein at least two of the light sources of the set of the multiple light sources emit light having different wavelengths.

12. The non-transitory computer readable medium of claim 8, wherein the instructions, when executed configure the processor to determine the respective positions of the characteristic points in the captured images based on identification of candidate points as possible characteristic points of a calibration pattern within an image of the calibration pattern by at least:

deriving a filtered image from the captured image including the calibration pattern;

determining spots within the filtered image, the spots being coherent sets of pixels of the filtered image having pixel values exceeding a threshold;

calculating central points of the spots; and identifying the calculated central points as the candidate points.

13. The non-transitory computer readable medium of claim 12, wherein the instructions, when executed, configure the processor to determine the spots within the filtered image by at least tracing a contour based on transitions between pixels with pixel values exceeding the threshold and neighboring pixels with pixel values below the threshold.

14. A method comprising:

receiving, from a camera, one or more captured images of a calibration field, a distance between the camera and the calibration field being less than a hyperfocal distance of the camera, the one or more captured images including multiple characteristic points within the calibration field;

receive, from the camera, one or more captured images of the calibration field, the one or more captured images including multiple characteristic points within the calibration field;

determine respective centers of the characteristic points in each captured image;

determine, based on the respective centers of the characteristic points in each captured image, respective positions of the characteristic points relative to the camera in each captured image; and calibrate the camera based on the positions of the characteristic points in each captured image.

15. The method of claim 14, wherein:

the calibration field comprises multiple light sources; and the characteristic points in each captured image are light points originating from one or more activated light sources of the multiple light sources.

16. The method of claim 15, further comprising:

activating a set of the multiple light sources according to a different activation scheme of a plurality of activation schemes for each captured image.

17. The method of claim 16, wherein at least two of the light sources of the set of the multiple light sources emit light having different wavelengths.

18. The method of claim 15, wherein the multiple light sources emit light having the same wavelength.

19. The method of claim 15, wherein determining the respective positions of the characteristic points in the captured images based on identification of candidate points as possible characteristic points of a calibration pattern within an image of the calibration pattern comprises:

deriving a filtered image from the captured image including the calibration pattern;

determining spots within the filtered image, the spots being coherent sets of pixels of the filtered image having pixel values exceeding a threshold;

calculating central points of the spots; and identifying the calculated central points as the candidate points.

20. The method of claim 19, wherein determining the spots within the filtered image comprises tracing a contour based on transitions between pixels with pixel values exceeding the threshold and neighboring pixels with pixel values below the threshold.

* * * * *